United States Patent
Ishibashi

(10) Patent No.: US 8,953,244 B2
(45) Date of Patent: *Feb. 10, 2015

(54) COLOR-SHIFTABLE ANTIREFLECTION FILM FOR CURVED FACE OF DISPLAY DEVICE FOR VEHICLE

(75) Inventor: Shuichi Ishibashi, Shimada (JP)

(73) Assignee: Yazaki Corporation, Tokyo (JP)

( * ) Notice: Subject to any disclaimer, the term of this patent is extended or adjusted under 35 U.S.C. 154(b) by 837 days.

This patent is subject to a terminal disclaimer.

(21) Appl. No.: 13/162,682

(22) Filed: Jun. 17, 2011

(65) Prior Publication Data

US 2011/0310477 A1    Dec. 22, 2011

(30) Foreign Application Priority Data

Jun. 17, 2010   (JP) ................. 2010-138278

(51) Int. Cl.
G02B 5/28      (2006.01)
B60K 35/00     (2006.01)
B60K 37/02     (2006.01)
G02B 1/11      (2006.01)

(52) U.S. Cl.
CPC .............. B60K 35/00 (2013.01); B60K 37/02 (2013.01); *B60K 2350/106* (2013.01); *B60K 2350/1064* (2013.01); *B60K 2350/1072* (2013.01); *B60K 2350/2082* (2013.01); *B60K 2350/2086* (2013.01); *B60K 2350/962* (2013.01); *G02B 1/11* (2013.01); *G02B 2207/123* (2013.01)
USPC .............. 359/589; 359/582; 296/70; 362/489

(58) Field of Classification Search
None
See application file for complete search history.

(56) References Cited

U.S. PATENT DOCUMENTS

| | | | | | |
|---|---|---|---|---|---|
| 4,910,090 | A | * | 3/1990 | Kuhlman et al. | ............. 428/469 |
| 5,219,625 | A | | 6/1993 | Matsunami et al. | |
| 5,829,861 | A | * | 11/1998 | Carter et al. | .................... 362/29 |
| 2003/0035972 | A1 | * | 2/2003 | Hanson et al. | ................ 428/480 |
| 2008/0233319 | A1 | | 9/2008 | Fushimi et al. | |
| 2009/0278677 | A1 | | 11/2009 | Arie et al. | |
| 2011/0037725 | A1 | * | 2/2011 | Pryor | ............................ 345/174 |
| 2011/0163867 | A1 | | 7/2011 | Arie et al. | |
| 2011/0309925 | A1 | * | 12/2011 | Ishibashi et al. | .............. 340/438 |

FOREIGN PATENT DOCUMENTS

DE    10-2009-001412 A1    9/2010
JP         54-142748 A    11/1979

(Continued)

OTHER PUBLICATIONS

Amended claims for U.S. Appl. No. 13/159,814, as submitted on Mar. 21, 2014.*

(Continued)

*Primary Examiner* — Arnel C Lavarias
(74) *Attorney, Agent, or Firm* — Sughrue Mion, PLLC

(57) ABSTRACT

A display device for a vehicle includes a front face cover that covers a front face of a display section for displaying information of the vehicle, and an antireflection film provided on a surface of the front face cover. The surface of the front face cover has a curved face which is formed so that an observation color of the curved face viewed from an eye range of a person sitting on a seat of the vehicle differs depending on an observation position in the eye range due to a difference in an interference wavelength of reflection light reflected by the antireflection film, the reflection light advancing toward the eye range from the front surface.

3 Claims, 5 Drawing Sheets

(56) References Cited

FOREIGN PATENT DOCUMENTS

| | | |
|---|---|---|
| JP | 63-90446 A | 4/1988 |
| JP | 5-5442 U | 1/1993 |
| JP | 10-119711 A | 5/1998 |
| JP | 10-203241 A | 8/1998 |
| JP | 10-221122 A | 8/1998 |
| JP | 2005-91032 A | 4/2005 |
| JP | 2005-186784 A | 7/2005 |
| JP | 2006-163156 A | 6/2006 |
| JP | 2007-62515 A | 3/2007 |
| JP | 2008-238646 A | 10/2008 |
| JP | 2009-51045 A | 3/2009 |
| JP | 2009-160062 A | 7/2009 |
| JP | 2011-207247 A | 10/2011 |
| JP | 2012-1109 A | 1/2012 |
| WO | 2005/102954 A1 | 11/2005 |
| WO | 2010-102694 A1 | 9/2010 |

OTHER PUBLICATIONS

Office Action issued Jul. 22, 2014 by the Japanese Patent Office in counterpart Japanese Application No. 2010-138278.

* cited by examiner

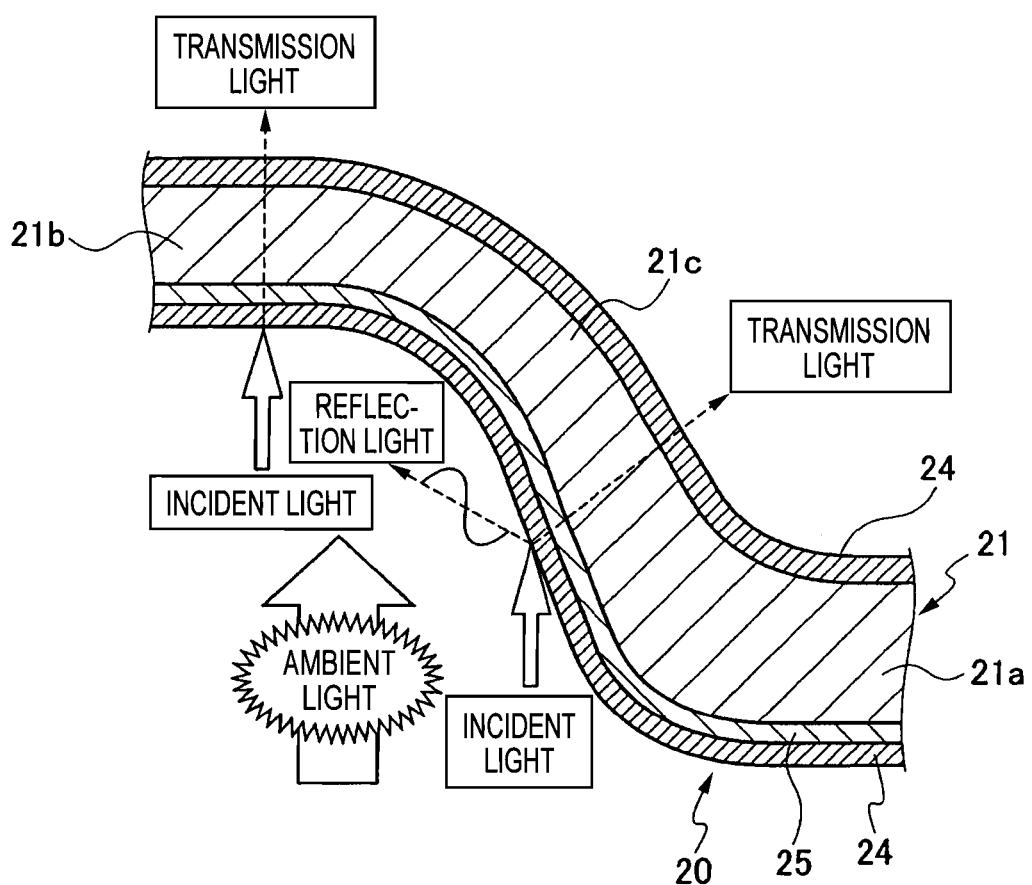

COLOR-SHIFTABLE ANTIREFLECTION FILM FOR CURVED FACE OF DISPLAY DEVICE FOR VEHICLE

BACKGROUND

The present invention relates to a display device for a vehicle that displays various information of the vehicle.

In vehicles, vehicle information such as a traveling speed of a vehicle, warning or the like is displayed on a display device for a vehicle. Such display device is arranged in a dashboard of the vehicle. A front face of the display device for the vehicle is covered with a front face cover which is formed of a translucent material for a purpose of preventing dust from entering.

In the display device for the vehicle, a hood for preventing glare has been provided at an upper portion of the front face cover so as not to prevent reflecting ambient light or the like from the front face cover to a driver side. However, such hood reduces a degree of freedom of designing of portions around the dashboard and possibly obstructs achieving of an originality in interior design of a vehicle.

Therefore, the applicants suggested a technique of obviating the need of a hood by providing an antireflection film on a surface of the front face cover (e.g., patent documents 1 and 2) in the past.

Patent Document 1: JP-A-10-119711
Patent Document 2: JP-A-10-221122

A display device for a vehicle that has an antireflection film provided on a surface of a front face cover as shown in the patent documents 1 and 2, mainly focuses on a structure of obviating the need of a hood. Therefore, it is premised that a shape of a surface of the front face cover is configured such that an incident angle of light reflected by the front face cover to a driver side is within an angular range capable of preventing reflection due to the antireflection film.

SUMMARY

The invention is made in view of the above circumstances, and the purpose of the invention is to provide a display device for a vehicle that can cause a front face cover to have a new function capable of achieving an advantage of an antireflection film and can improve its design property.

In order to achieve the above object, according to the present invention, there is provided a display device for a vehicle, comprising:

a front face cover that covers a front face of a display section for displaying information of the vehicle; and an antireflection film provided on a surface of the front face cover, wherein the surface of the front face cover has a curved face which is formed so that an observation color of the curved face viewed from an eye range of a person sitting on a seat of the vehicle differs depending on an observation position in the eye range due to a difference in an interference wavelength of reflection light reflected by the antireflection film, the reflection light advancing toward the eye range from the front surface.

According to the above configuration, the antireflection film provided on the surface of the front face cover makes phases of reflection light by the surface of the antireflection film and the reflection light by the surface of the front face cover different from one another by a half wavelength so as to cancel the reflection lights with each other. Therefore, the driver is not bothered by the reflection light from the surface of the front face cover.

Regarding the antireflection film provided at a curved face part of the front face cover, an observation direction of the driver with respect to the antireflection film from the eye range or a projection direction of light from a light source with respect to the antireflection film differs depending on its position. In a multi-layer film like the antireflection film which is formed by laminating a plurality of films having different refraction indexes, an interference wavelength generated due to a spectroscopic effect of the multi-layer film is changed when a viewing angle or a projection angle of light is changed so that an appearance color of the multi-layer film is changed.

For this reason, the driver may visually observe the curved face part in the surface of the front face cover by a different color depending on its position. Accordingly, a part of which the color visually observed by a driver differs depending on its position, is provided on the surface of the front face cover, so that a visually design property as the display device for a vehicle can be improved.

Preferably, the display section has a pointer display portion which indicates a measurement value by using a pointer, and the curved face is provided on a portion in the front face cover which faces an outer edge part of the pointer display portion.

According to the above configuration, when a driver visually observes the pointer display portion from the eye range, the curved face of the front face cover is visually observed in a portion outside of the pointer display portion. By providing the antireflection on the curved face, a ring shaped part at the outside of the pointer display portion is to be visually observed by a color that differs depending on its position.

Therefore, a driver may visually observe the ring shaped part at the outside of the pointer display portion by a color that differs depending on its position. Accordingly, the pointer display portion as a main display component in a display face can be made conspicuous because of the existence of the ring shaped part of which the observation color differs depending on an observation position. Consequently, it is possible to improve a visually design property as the display device for a vehicle.

Preferably, the display section includes a first display unit which is arranged in a portion inside of a steering wheel of the vehicle in a radial direction of the steering wheel on a field of view from the eye range and a second display unit which is arranged in a portion outside of the steering wheel in the radial direction of the steering wheel on the field of view from the eye range, and the curved face is provided on a stepwise cover part which connects between a first cover part covering a front face of the first display unit and a second cover part covering a front face of the second display unit in the front face cover.

According to the above configuration, when a driver visually observes the display section from the eye range, the third cover part having the curved face is positioned behind the steering wheel. By providing the antireflection on the curved face, the third cover part is to be visually observed by a color that differs depending on its position.

Therefore, while the third cover part is positioned behind the steering wheel, the curved face part of the third cover part that covers a portion of a display face which is not liable to be set to a portion for displaying vehicle information as compared to the first display face and the second display face, is configured such that an observation color of the curved face part differs depending on its observation position due to the antireflection film provided on the curved face part so as to be conspicuous. Accordingly, a visually design property as the display device for a vehicle can be improved.

In accordance with the display device for a vehicle according to the invention, it is possible to cause the front face cover to have a new function capable of achieving an advantage of an antireflection film and to improve its design property.

BRIEF DESCRIPTION OF THE DRAWINGS

The above objects and advantages of the present invention will become more apparent by describing in detail preferred exemplary embodiments thereof with reference to the accompanying drawings, wherein:

FIG. 5 is a main part enlarged cross sectional view explanatorily showing a state of transmission and reflection of light at a curved part of the front face cover in FIG. 2.

DETAILED DESCRIPTION OF EXEMPLARY EMBODIMENTS

Figure 1:
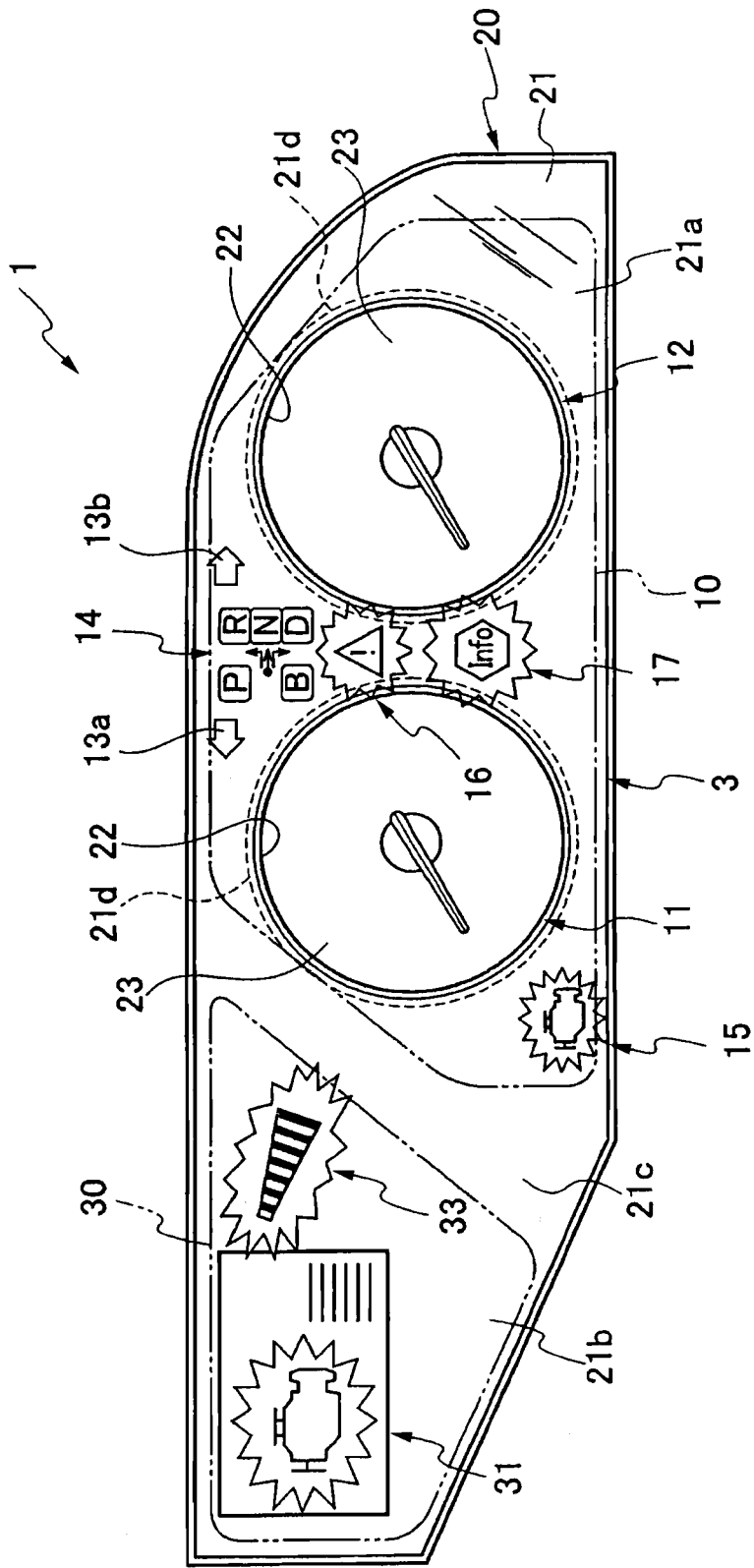
FIG. 1 is an elevational view showing a display device for a vehicle according to an embodiment of the invention.

An embodiment of the invention is described with reference to the accompanying drawings. First, a positional relationship between a display device for a vehicle and a steering wheel according to the embodiment of the invention is described below with reference to FIG. 1. FIG. 1 is an elevational view showing the display device for a vehicle according to the embodiment of the invention.

As shown in FIG. 1, the display device 1 for a vehicle displays various information (vehicle information) on a dial plate 3 (corresponding to a display section). The dial plate 3 has a first display area 10 (corresponding to a first display unit), a second display area 30 (corresponding to a second display unit), and a front face cover 20 that is configured by a single member and covers both of the front face of the first display area 10 and the front face of the second display area 30. A housing (not shown) of the first display area 10 and a housing (not shown) of the second display area 30 may be combined together or separated from each other.

The first display area 10 displays vehicle information such as a speed meter 11, a tachometer 12, winkers 13a and 13b, a shift range 14, an engine control abnormality symbol 15, a warning state symbol 16, a notice information symbol 17 for a notice other than warning (hereinafter, referred to as "the notice information symbol") or the like.

The second display area 30 displays vehicle information 31 having a correlation with a display content of vehicle information displayed on the first display area 10 if needed. The vehicle information 31 is, for example, state information having a correlation with an abnormality in controlling of an engine of the vehicle at a time when the first display area 10 displays the engine control symbol 15 and the warning state symbol 16 or various maintenance information of the vehicle at a time when the first display area 10 displays the notice information symbol 17.

Meanwhile, during the displaying of the vehicle information 31, the second display area 30 displays a guidance symbol 33 for attracting an attention of a user to the display of the vehicle information 31 on the second display area 30. The guidance symbol 33 has, for example, an outer shape which is tapered so as to be thinner as it is separated from the first display area 10, and is divided into a plurality of segments in a direction of approaching to or separating from the first display area 10. During the displaying of the guidance symbol 33, a mode that the segments are sequentially displayed from a side of a first display area 10 to a side of the second display area 30, is repeated. The displaying of the guidance symbol 33 as described above can guide a line of sight of a driver (not shown) who is paying attention to the first display area 10, onto the second display area 30.

The front face cover 20 is adapted to prevent dust or the like from adhering to the front faces of the dial plate 3, and has a cover body 21, and two sets of a meter ring 22 and a meter cover 23.

The cover body 21 is formed of a translucent material, and has a first cover part 21a for covering the front face of the first display area 10, a second cover part 21b for covering the front face of the second display area 30 and a third cover part 21c connecting the first cover part 21a and the second cover part 21b to each other.

Figure 2:
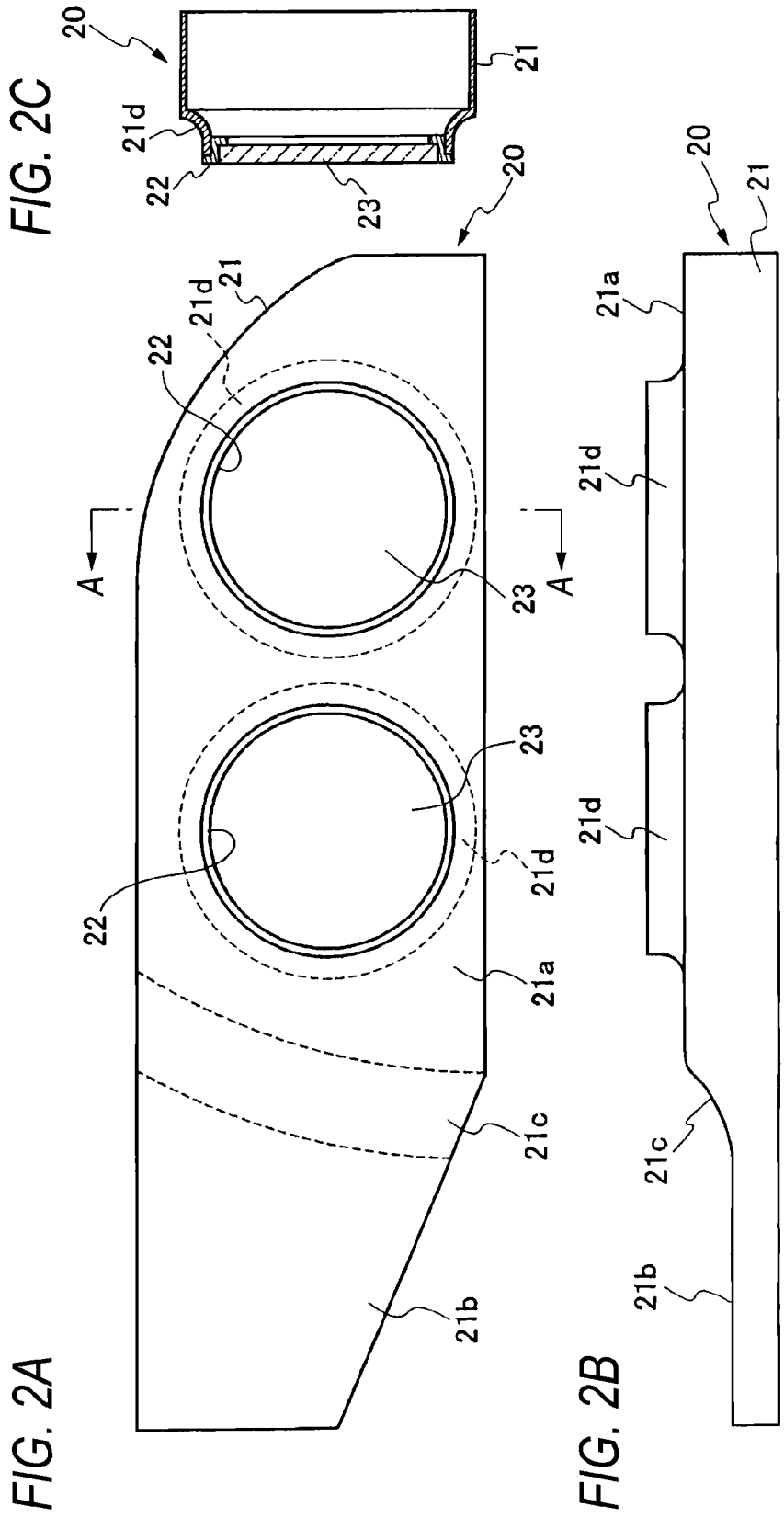
FIG. 2A is an elevational view showing a front face cover shown in FIG. 1.
FIG. 2B is a bottom view showing the front face cover shown in FIG. 1.
FIG. 2C is a cross sectional view of FIG. 2B taken along line A-A.

As shown in FIGS. 2A and 2B, the first cover part 21a has cylindrical protruding parts 21d and 21d each having a curved tapered shape corresponding to the speed meter 11 and the tachometer 12 in the first display 10. Each of the first cover part 21a and the second cover part 21b other than the cylindrical protruding parts 21d is formed to be roughly plane. As shown in FIG. 2B, the first cover part 21a and the second cover part 21b are constituted such that the positions thereof are shifted with each other in the back-and-forth direction of the vehicle. Therefore, the third cover part 21c is formed by a stepwise face having a curved face.

In the embodiment, the curved faces of the third cover part 21c and the cylindrical protruding parts 21d correspond to curved faces.

As shown in FIG. 2A, the meter ring 22 is formed in a ring shape. As shown in FIG. 2C, the meter ring 22 is attached and fixed to an open end of the cylindrical protruding part 21d. The meter cover 23 is formed of a translucent material in a disc shape and is fitted into and fixed to a circular open part of the meter ring 22. The cover body 21 and the meter cover 23 can be in a color combination of the same colors or different colors (including non-color). By changing the color combination, it is possible to achieve variation in decorative properties on the front face cover 20.

Figure 3:
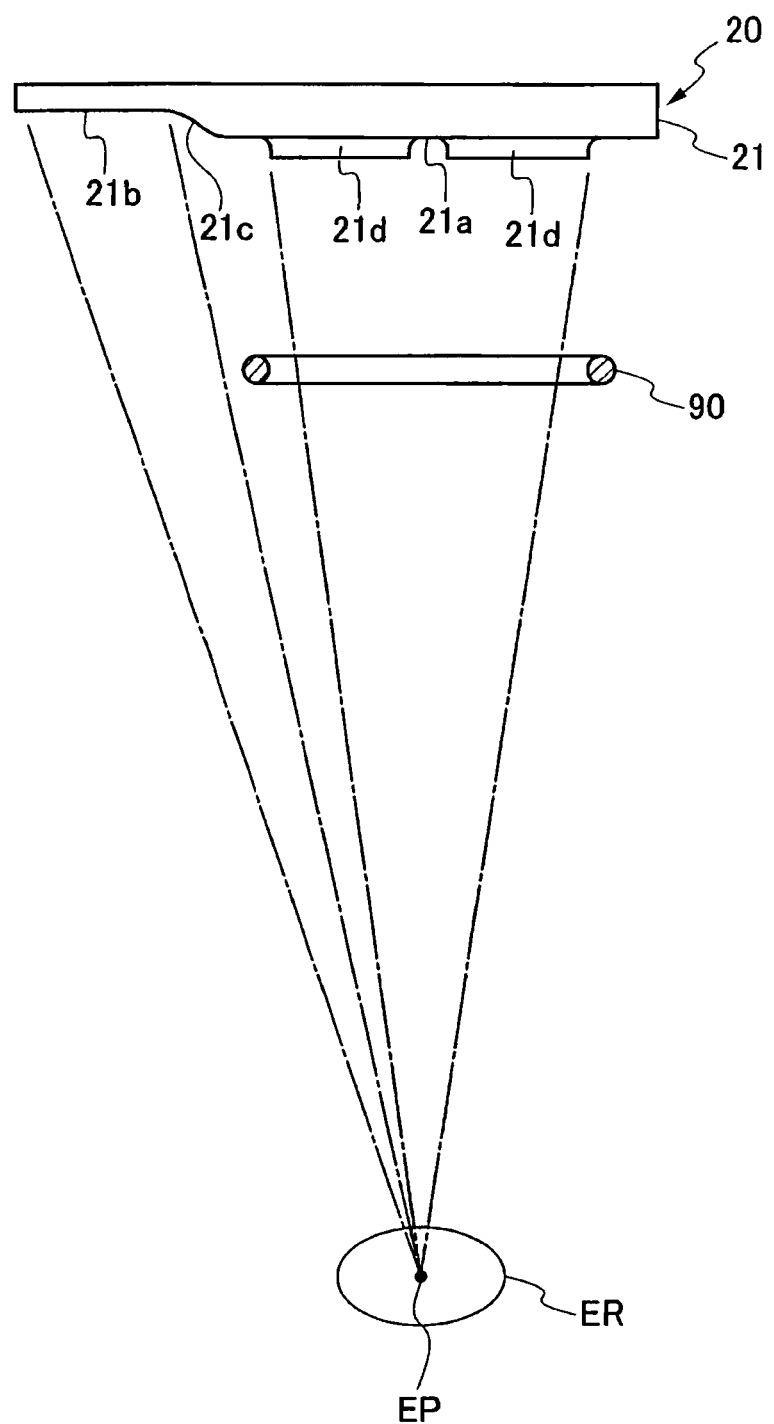
FIG. 3 is an explanatory view showing a positional relationship among the front face cover in FIG. 2, a steering wheel and an eye point of a driver.

The front face cover 20 having the above structure is arranged behind the steering wheel 90 as shown in FIG. 3. The front face cover 20 is formed in a continuous integral shape extending over the first and second display areas 10, 30 in the radial direction of the steering wheel 90 so as to cover the front faces of the first and second display areas 10, 30. The first cover part 21a of the cover body 21 and the first display area 10 having the front face covered by the first cover part 21a are arranged in a portion near the steering wheel 90 rather than the second cover part 21b of the cover body 21 and the second display area 30 having the front face covered second cover part 21b.

Thus, since the second display area 30 and the second cover part 21b are separated from the steering wheel 90 in the back-and-forth direction of the vehicle rather than the first display area 10 and the first cover part 21a, a hand of a driver who operates the steering wheel 90 is prevented from interfering with the second display area 30 and the second cover part 21b.

The front face cover 20 arranged as in the above, is constituted in such a manner that the first cover part 21a of the cover body 21 is positioned in a portion inside of the steering wheel 90 in the radial direction of the steering wheel 90 and the second cover part 21b is positioned in a portion outside of the steering wheel 90 in the radial direction of the steering wheel 90 on a field of view of a driver (not shown) from an eye point EP positioned in an eye range ER of the vehicle.

Figure 4:
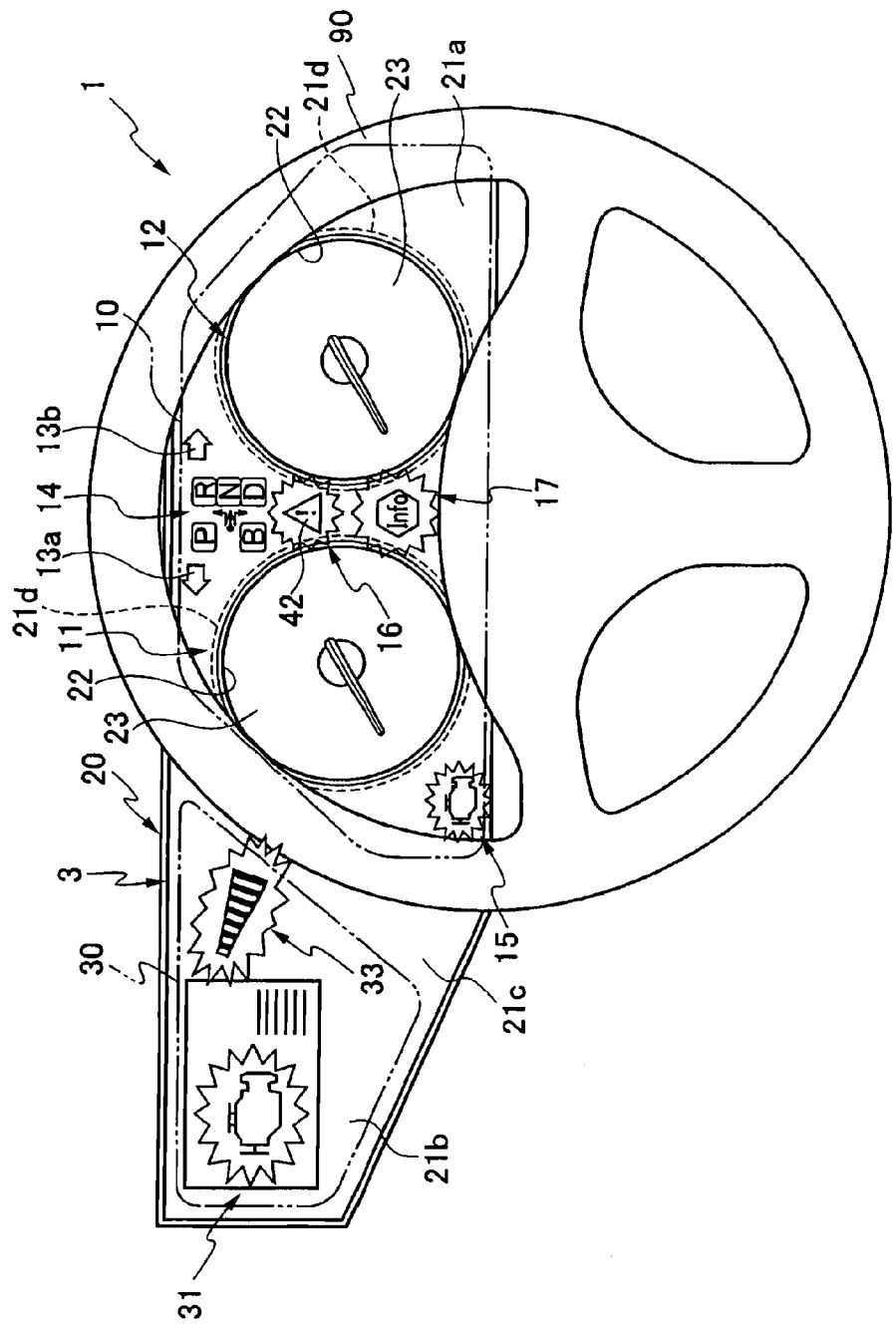
FIG. 4 is an explanatory view showing a positional relationship between the display device and the steering wheel on a field of view of the driver from the eye point in FIG. 3.

Therefore, as shown in FIG. 4, the driver (not shown) can visually observe a display content of the first display area 10 through the portion inside of the steering wheel 90 in the radial direction thereof and can visually observe a display content of the second display area 30 through the portion outside of the steering wheel 90 in the radial direction thereof.

Meanwhile, in the display device 1 for a vehicle of the embodiment, an antireflection film 24 (see FIG. 5) is formed on each of the cover body 21 and the meter cover 23 of the front face cover 20. As shown in FIG. 5 which shows the third cover part 21c of the cover body 21 by enlarging it, the antireflection films 24 are respectively formed on both of front and rear faces of the cover body 21 of the embodiment. An optical path restriction film 25 formed of fine louvers in which shading parts and translucent parts are alternately arranged in a striped pattern, is provided between the surface of the cover body 21 and the antireflection film 24. The optical path restriction film 25 is adapted to prevent light in an unnecessary direction from passing through the cover body 21. The optical path restriction film 25 can be formed on the rear face of the cover body 21 or both of the front and rear faces thereof. The optical path restriction film 25 can be formed to be superposed on the antireflection film 24 so as to cover the antireflection film 24 which is directly formed on the front or rear face of the cover body 21.

The antireflection film 24 is formed in such a manner that a plurality thin films having different refraction indexes are laminated. The antireflection film 24 cancels reflection light reflected by the surface of the antireflection film 24 by using reflection light which passes through the antireflection film 24, is reflected by the surface of the front face cover 20 and has a phase shifted by a half wavelength therefrom so as to prevent light projected to the front face cover 20 from being reflected. Therefore, the antireflection film 24 prevents ambient light or the like from being reflected to a driver side by the front face cover 20.

Meanwhile, in the cylindrical protruding parts 21d of the first cover part 21a and the third cover part 21c each having the curved face, a relative relationship between directions of lines of sight of the driver from the eye point EP with respect to the normal lines thereof differs depending on the position. That is, regarding the antireflection film 24 of the cylindrical protruding parts 21d or the third cover part 21c, the direction of the line of sight to the film face (the surface) of the antireflection film 24 differs depending on the eye point EP of the driver.

In the cylindrical protruding part 21d or the third cover part 21c, even when light is projected from a light source identical to a light source of the first cover part 21a or the second cover part 21b excluding the cylindrical protruding part 21d, an incident angle of the light with respect to the antireflection film 24 is different from that of the first cover part 21a or the second cover part 21b excluding the cylindrical protruding part 21d.

In a multi-layer film like the above described antireflection film 24 formed such that a plurality of thin films having different refraction indexes are laminated, when a view angle is changed or a projection angle of light is changed, an interference wavelength generated due to a spectroscopic effect caused by the multi-layer film is changed so that an appearance color of the multi-layer film is changed.

Therefore, the driver may visually observe the cylindrical protruding part 21d of the first cover part 21a having the curved face or the third cover part 21c having the curved face as an iridescence color whereby the appearance color is changed depending on the direction of the line of sight of the driver with respect to the surfaces thereof.

Thus, the display device 1 according to the embodiment is configured such that the antireflection films 24 are provided on both of front and rear surfaces of the front face cover 20 that covers the front face of the dial plate 3, and the cylindrical protruding parts 21d and the third cover part 21c each having the curved face are provided on the front face cover 20.

Consequently, a new function of differentiating an appearance color on the front face cover watched by a driver from the eye point depending on its position, is given to the antireflection film 24 provided on the front face cover 20 for the purpose of preventing glare at each of the curved face parts of the cylindrical protruding parts 21d and the third cover part 21c so that it is possible to improve a design property of the front face cover 20 having the antireflection film 24 provided thereon.

Particularly, the cylindrical protruding parts 21d of the first cover part 21a having the curved face are respectively positioned at portions facing outer edges of the speed meter 11 and the taco meter 12 which are main display components on the dial plate 3. Therefore, since an appearance color watched by a driver differs depending on its position by the antireflection film 24 formed on each cylindrical protruding part 21d having the curved face provided thereon, it is possible to make the speed meter 11 or the tachometer 12 conspicuous by the existence of the ring shaped part (the cylindrical protruding part 21d) at each of the outer edges, the ring shaped part differing the observation color depending on the observation position.

In addition, since the third cover part 21c having the curved face is positioned behind the steering wheel 90, the third cover part 21c covers a portion of the dial plate 3 which is not liable to be set to a portion for displaying the vehicle information 31 as the first display area 10 or the second display area 20. For this reason, a frequency of observation of the third cover part 21c by a driver may be lower than that of the first cover part 21a or the second cover part 21b. However, since an appearance color watched by a driver is made different depending on its position by the antireflection film 24 formed on the third cover part 21c having the curved face provided thereon, it is possible to make the third cover part 21c to be a visually conspicuous part, thereby improving the design property.

While the curved faces are respectively provided at the cylindrical protruding parts 21d of the first cover part 21a and the third cover part 21c in the embodiment, the curved face may be provided at either one of them.

In addition, while the vehicle information 31 are separately displayed on the first display area 10 positioned in a portion inside of the steering wheel 90 and on the second display area positioned in a portion outside of the steering wheel 90 in the radial direction on a field of view of a driver in the embodiment, the arrangement of the display faces for displaying the vehicle information is not limited to the arrangement in the embodiment and is arbitrary.

Further, while the antireflection films 24 are respectively formed on the front and rear surfaces of the cover body 21 in the embodiment, the antireflection film 24 can be formed only on the front surface of the cover body 21. It is arbitrary whether or not the antireflection film 24 is formed on each of the cover body 21 and the meter cover 23.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2010-138278 filed on Jun. 17, 2010, the contents of which are incorporated herein by reference.

This invention is markedly useful for a case where the antireflection film is provided on the front face cover that covers the front face of the display face of the display device for a vehicle.

REFERENCE SIGNS LIST 1 display device
3 dial plate (display section)
10 first display area (first display unit)
11 speed meter (vehicle information, pointer display portion)
12 taco meter (vehicle information, pointer display portion)
13a, 13b winker (vehicle information)
14 shift range (vehicle information)
15 engine control abnormality symbol (vehicle information)
16 warning state symbol (vehicle information)
17 symbol of information of notice other than warning (vehicle information)
20 front face cover
21 cover body
21a first cover part
21b second cover part
21c third cover part (curved face)
21d cylindrical protruding section 21d (curved face, ring shaped part)
22 meter ring
23 meter cover
24 antireflection film
25 optical path restriction film
30 second display area (second display unit)
31 vehicle information
33 guidance symbol
90 steering wheel
EP eye point
ER eye range

What is claimed is:

1. A display device for a vehicle, comprising:
 a front face cover that covers a front face of a display section for displaying information of the vehicle; and
 an antireflection film provided on a surface of the front face cover,
 wherein the surface of the front face cover has a curved face which is formed so that an observation color of the curved face viewed from an eye range of a person sitting on a seat of the vehicle differs depending on an observation position in the eye range due to a difference in an interference wavelength of reflection light reflected by the antireflection film, the reflection light advancing toward the eye range from the front surface.

2. The display device according to claim 1, wherein the display section has a pointer display portion which indicates a measurement value by using a pointer; and
 wherein the curved face is provided on a portion in the front face cover which faces an outer edge part of the pointer display portion.

3. The display device according to claim 1, wherein the display section includes a first display unit which is arranged in a portion inside of a steering wheel of the vehicle in a radial direction of the steering wheel on a field of view from the eye range and a second display unit which is arranged in a portion outside of the steering wheel in the radial direction of the steering wheel on the field of view from the eye range; and
 wherein the curved face is provided on a stepwise cover part which connects between a first cover part covering a front face of the first display unit and a second cover part covering a front face of the second display unit in the front face cover.

* * * * *